United States Patent
Yokoi

(10) Patent No.: US 10,793,096 B2
(45) Date of Patent: Oct. 6, 2020

(54) VEHICLE CONTROL DEVICE WITH OBJECT DETECTION

(71) Applicant: DENSO CORPORATION, Kariya, Aichi-pref. (JP)

(72) Inventor: Yusuke Yokoi, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/342,326

(22) PCT Filed: Oct. 10, 2017

(86) PCT No.: PCT/JP2017/036715
§ 371 (c)(1),
(2) Date: Apr. 16, 2019

(87) PCT Pub. No.: WO2018/074287
PCT Pub. Date: Apr. 26, 2018

(65) Prior Publication Data
US 2019/0263344 A1  Aug. 29, 2019

(30) Foreign Application Priority Data
Oct. 18, 2016 (JP) .................................. 2016-204534

(51) Int. Cl.
*B60R 21/00* (2006.01)
*B60T 7/12* (2006.01)
(Continued)

(52) U.S. Cl.
CPC .............. *B60R 21/00* (2013.01); *B60R 21/01* (2013.01); *B60T 7/12* (2013.01); *B60T 7/22* (2013.01);
(Continued)

(58) Field of Classification Search
CPC ........ B60T 8/00; B60T 7/12; B60T 2201/022; G01S 13/00; G01S 13/931; G08G 1/16; G08G 1/166; B60W 30/08
See application file for complete search history.

(56) References Cited

U.S. PATENT DOCUMENTS

2017/0309182 A1* 10/2017 Murray ................. G01S 13/931

FOREIGN PATENT DOCUMENTS

| JP | 2008-117073 A | 5/2008 | |
|----|---|---|---|
| JP | 2008117073 | * 5/2008 | ............... G08G 1/16 |
| JP | 2012-048460 A | 3/2012 | |

* cited by examiner

*Primary Examiner* — Hongmin Fan
(74) *Attorney, Agent, or Firm* — Maschoff Brennan

(57) ABSTRACT

A vehicle control device detects an object existing in front in a traveling direction of a host vehicle by an object detection sensor, and performs collision avoidance control with respect to the object based on a detection result and includes: a determining unit that, in a case where there is an object moving toward the front of the host vehicle in a direction intersecting the traveling direction of the host vehicle, determines that a portion other than a front end portion of the object is acquired by the object detection sensor as a detection position of the object and a control unit that, in a case where it is determined that a portion other than the front end portion of the object has been acquired, permits collision avoidance control to be performed even when a lateral position of the acquired portion is not in a collision prediction area.

6 Claims, 5 Drawing Sheets

(51) Int. Cl.
*B60T 8/171* (2006.01)
*G08G 1/16* (2006.01)
*B60T 8/00* (2006.01)
*B60W 30/08* (2012.01)
*G01S 13/00* (2006.01)
*B60R 21/01* (2006.01)
*B60T 7/22* (2006.01)

(52) U.S. Cl.
CPC ................ *B60T 8/00* (2013.01); *B60T 8/171* (2013.01); *B60W 30/08* (2013.01); *G01S 13/00* (2013.01); *G08G 1/16* (2013.01); *G08G 1/166* (2013.01); *B60R 2021/0002* (2013.01); *B60T 2201/022* (2013.01)

□ : POSITION HISTORY OF FRONT VEHICLE
△ : POSITION HISTORY OF HOST VEHICLE

VEHICLE CONTROL DEVICE WITH OBJECT DETECTION

INCORPORATION BY REFERENCE

This application is a national stage application of PCT Application No. PCT/JP2017/036715, filed on Oct. 10, 2017, which claims the benefit of priority from Japanese Patent Application No. 2016-204534 filed on Oct. 18, 2016, the contents of which are hereby incorporated by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a vehicle control device that performs collision avoidance control with respect to an object.

BACKGROUND ART

Conventionally, a technique has been proposed for detecting an object existing around a host vehicle and performing collision avoidance control with respect to the object based on a detection result. For example, in the vehicle control device described in Patent Literature 1, collision avoidance control is performed based on position information of an object acquired by an object detection sensor and a collision prediction area that is a target of collision avoidance control. More specifically, in the case where the distance between an object and a host vehicle is equal to or less than a specified distance and the lateral position of the object is in the collision prediction area, a warning device, a brake device, or the like is operated as collision avoidance control.

CITATION LIST

Patent Literature

[PTL 1]: JP 2012-048460 A

SUMMARY OF THE INVENTION

Incidentally, another vehicle existing in front of the host vehicle in the traveling direction (a front vehicle) may enter (cut in) into the traveling path of the host vehicle. Here, when the front vehicle performs an operation of cutting in, depending on the attitude of the front vehicle, it is conceivable that the rear portion of the front vehicle will be detected by the object detection sensor, and in that case, based on the position of the rear portion of the front vehicle, collision avoidance control will be executed. In this case, when the lateral position of the rear portion of the front vehicle is not in the collision prediction area, the collision avoidance control will not be executed. Therefore, there is concern that the collision avoidance control may not be appropriately executed for the front vehicle performing the operation of cutting in.

Taking into consideration the problem described above, an object of the technique according to the present disclosure is to provide a vehicle control apparatus capable of properly performing collision avoidance control in the case where an object existing in front in the traveling direction of a host vehicle enters into the traveling path of the host vehicle.

The technique according to the present disclosure is a vehicle control device for detecting an object existing in front in a traveling direction of a host vehicle by an object detection sensor and performing collision avoidance control with respect to the object based on a detection result; including: a determining unit that, in a case where there is an object moving toward the front of the host vehicle in a direction intersecting the traveling direction of the host vehicle, determines that a portion other than a front end portion of the object is acquired by the object detection sensor as a detection position of the object; and a control unit that, in a case where it is determined that a portion other than the front end portion of the object has been acquired, permits collision avoidance control to be performed even when a lateral position of the acquired portion is not in a collision prediction area as a target of the collision avoidance control.

For example, when a front vehicle cuts in into the traveling path of the host vehicle, it is considered that the front vehicle enters into the traveling path of the host vehicle at an angle. In other words, in this case, the front portion (for example, the front end portion) of the preceding vehicle enters into the traveling path of the host vehicle earlier than the rear portion (for example, the rear end portion).

In regard to this point, in the above-described configuration, in the case where there is an object moving toward the front of the host vehicle in a direction intersecting the traveling direction of the host vehicle, it is determined that a portion other than the front end portion of the object is acquired by the object detection sensor as the detection position of the object. Here, in the case where there is an object moving toward the front of the host vehicle in a direction intersecting the traveling direction of the host vehicle, and a portion other than the front end portion of the object is acquired as the detected position of the object, it is considered that the object enters into the traveling path of the host vehicle at an angle. Then, in this case, there is a possibility that the front end portion of the object has already entered into the traveling path of the host vehicle. Therefore, in the case where it is determined that a portion other than the front end portion of the object has been acquired, collision avoidance control is permitted to be performed even when the lateral position of the acquired portion is not in the collision prediction area. Therefore, compared to the case where collision avoidance control is performed based only on the lateral position acquired by the object detection sensor, collision avoidance control can be performed more quickly. As a result, the collision avoidance control can be appropriately performed with respect to the object entering into the traveling path of the host vehicle.

BRIEF DESCRIPTION OF THE DRAWINGS

The above-described objects and other objects, features and advantages of the technique according to the present disclosure will become more apparent from the following detailed description with reference to the accompanying drawings. Of the drawings.

DESCRIPTION OF EMBODIMENTS

Figure 1:
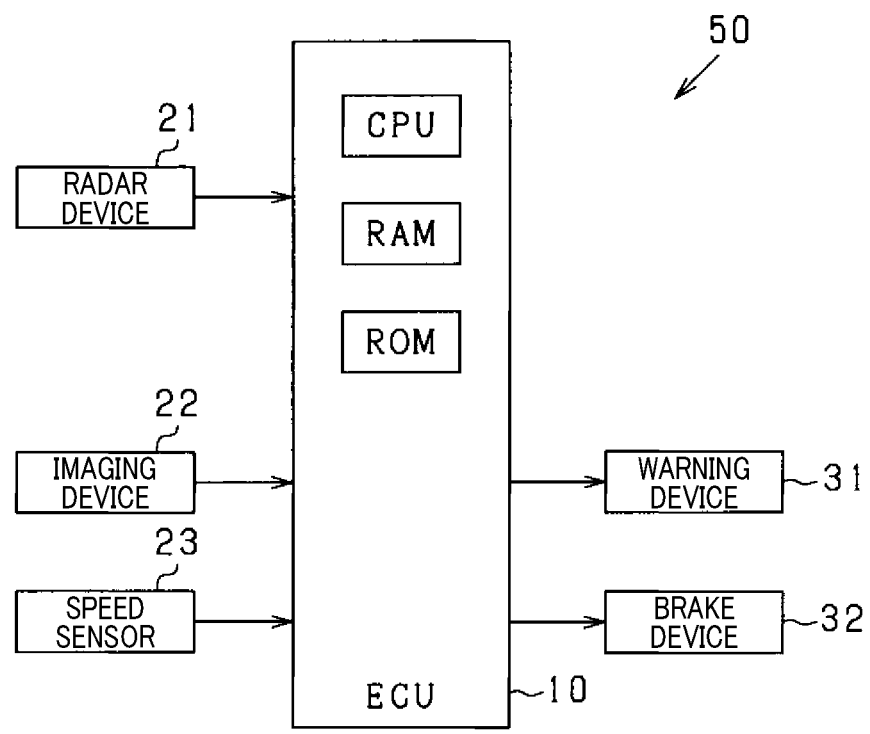
FIG. 1 is a diagram illustrating a schematic configuration of a PCSS of a vehicle.

FIG. 1 illustrates a pre-crash safety system (hereinafter referred to as PCSS) to which a vehicle control device is applied. PCSS is an example of a vehicle system mounted in a vehicle and detects objects existing around a host vehicle, and in the case where there is a possibility that the detected object and the host vehicle will collide with each other, performs a collision avoidance operation, or collision mitigation operation.

The vehicle 50 illustrated in FIG. 1 includes object detection sensors of a radar device 21 and an imaging device 22, a vehicle speed sensor 23, an ECU 10, a warning device 31, and a brake device 32. In the embodiment illustrated in FIG. 1, the ECU 10 functions as a vehicle control device.

The radar device 21 detects an object in front of a host vehicle using electromagnetic waves (search waves) such as millimeter waves, lasers, and the like, and is mounted on the front portion of the host vehicle 50 so that its optical axis faces forward of the host vehicle. The radar device 21 scans an area spreading over a specified range toward the front of the host vehicle at every specified time with a radar signal and receives the electromagnetic waves reflected by the surface of an object in front, thereby detecting the relative position of the object in front, as object information. Note that the relative position, in the case where the host vehicle 50 is taken to be the origin, is acquired as the position on a relative coordinate system with the vehicle width direction of the host vehicle 50 as the X-axis and the traveling direction of the host vehicle 50 as the Y-axis. At the relative position, the component in the vehicle width direction (X-axis) indicates the lateral position of the object with respect to the host vehicle 50, and the component in the traveling direction (Y-axis) of the host vehicle 50 indicates the distance to the object in front. The acquired object information is inputted to the ECU 10.

The imaging device 22 is an in-vehicle camera, and is configured using, for example, a CCD camera, a CMOS image sensor, a near infrared camera, or the like. The imaging device 22 is attached at a specified height (for example, near the upper end of the windshield) at the center in the vehicle width direction of the host vehicle 50, and captures an image from a bird's-eye viewpoint of an area spreading over a specified angle range toward the front of the host vehicle. The captured image is inputted to the ECU 10 at every specified interval. Note that the imaging device 22 may be a monocular camera or a stereo camera.

The vehicle speed sensor 23 detects the traveling speed of the host vehicle 50 based on the rotational speed of the wheels. The detection result by the vehicle speed sensor 23 is inputted to the ECU 10.

The warning device 31 warns the driver of the fact that an object is present in front of the host vehicle in accordance with a control command from the ECU 10. The warning device 31 is configured, for example, by a speaker or a display unit for displaying an image provided inside the vehicle.

The brake device 32 is a braking device that brakes the host vehicle 50. The brake device 32 operates when the possibility of collision with an object in front increases. More specifically, the braking force for the braking operation by the driver is made stronger (brake assist function), and when the braking operation is not performed by the driver, automatic braking is performed (automatic braking function).

The ECU 10 is configured as a known microcomputer including a CPU and various memories (ROM, RAM), and executes control in the host vehicle 50 with reference to calculation programs and control data in the memory. The ECU 10 detects an object based on object information outputted from the radar device 21 and a captured image outputted from the imaging device 22, and based on the detection result, executes a PCS process with the warning device 31 and the brake device 32 as control targets.

In the following, the PCS process executed by the ECU 10 will be described. The ECU 10 sets a collision prediction area in which an object is set as a target of the collision avoidance control. The collision prediction area is set based on the lateral velocity Vx of the object, for example, and is set so as to widen in the lateral direction as the lateral velocity Vx of the object increases. The width in the horizontal axis direction of the collision prediction area is set based on the width of the vehicle 50, for example. Further, the ECU 10 calculates the collision allowance time TTC (Time to Collision) with respect to the object.

Then, the ECU 10 determines whether the lateral position of the object outputted from the radar device 21 is in the collision prediction area, and when the lateral position of the object is in the collision prediction area, the ECU 10 operates the respective devices based on the separately calculated TTC and the operation timing of both the warning device 31 and the brake device 32. More specifically, when the TTC becomes equal to or less than the operation timing of the warning device 31, the speaker or the like is operated to issue a warning to the driver. Moreover, when the TTC becomes equal to or less than the operation timing of the brake device 32, a control such as reducing the collision speed by operating the automatic brake or the like is performed. It should be noted that each device may be operated by using the distance to the object based on the TTC.

On the other hand, regarding the detection of an object based on a captured image, the ECU 10 acquires image data from the imaging device 22, and based on the image data and prepared dictionary information for object identification, exists in front of the vehicle to determine the type of the object. Dictionary information for object identification is individually prepared according to the kind of object, for example an automobile, a two-wheeled vehicle, a pedestrian, an obstacle on the road, and is stored in advance in a memory. As the dictionary information of an automobile, dictionary information of at least the front pattern and the rear pattern is prepared and furthermore, as a pattern of the front portion or the rear portion of the automobile, for example, a dictionary may be prepared for each of plurality of vehicle types of vehicles such as a large vehicle, a regular automobile, a compact automobile and the like. The ECU 10 determines the type of the object by matching the image data and the dictionary information by pattern matching.

Then, based on the image data and the dictionary information, the ECU 10 calculates position information (including the lateral width and the like of the object) of the object in the lateral direction with respect to the traveling direction of the host vehicle 50. Then, based on the position information of the object and the collision prediction area, collision avoidance control with respect to the object is performed. For example, the collision avoidance control may be configured so as to be performed according to an overlapping ratio of the lateral width of the object and the collision prediction area.

Incidentally, there are cases where the front vehicle 60 existing in front of the vehicle 50 enters (cuts in or the like) into the traveling path of the host vehicle 50. In such a case, depending on the attitude (orientation) of the front vehicle 60, the rear portion (for example, the rear end portion) of the front vehicle 60 may be detected by the object detection sensor, and accordingly, it is considered that inconveniences such as delay in the implementation of the collision avoidance control may occur.

Figure 2:
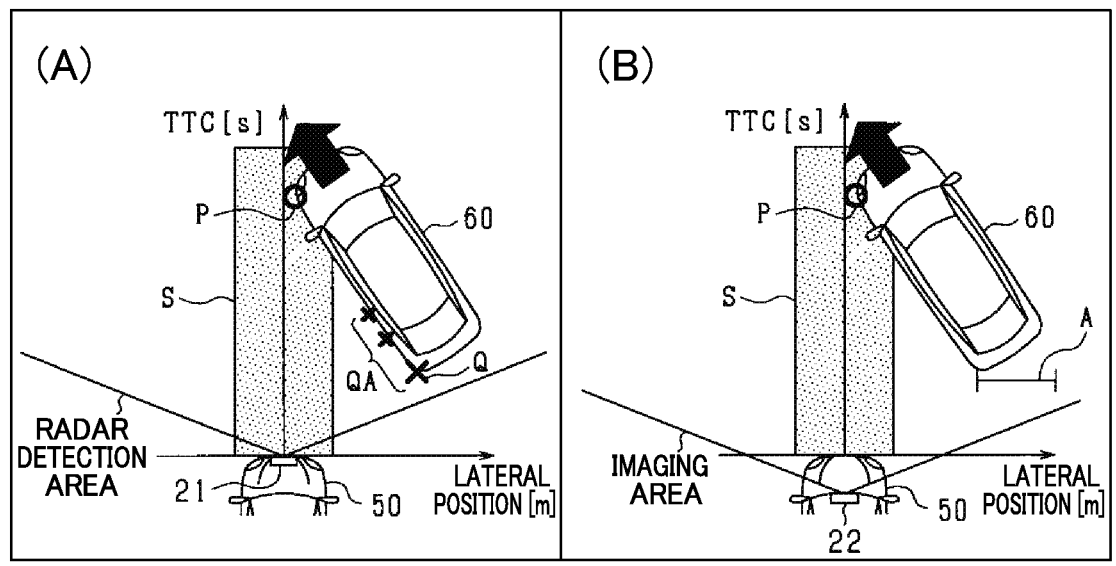
FIGS. 2(A) and (B) are diagrams for explaining sensor detection in a situation in which a front vehicle enters into a traveling path of a host vehicle.

FIG. 2 illustrates a situation in which the front vehicle 60 performs an operation of cutting in into the traveling path of the host vehicle 50. FIG. 2 illustrates a state in which the host vehicle 50 and the front vehicle 60 are present on the traveling path of the host vehicle 50, and the attitude of the front vehicle 60 is inclined in the lateral direction with respect to the traveling path (traveling direction) of the host vehicle 50. Incidentally, (A) of FIG. 2 illustrates the detection result of the front vehicle 60 by the radar device 21, and (B) of FIG. 2 illustrates the detection result of the front vehicle 60 by the imaging device 22.

In (A) of FIG. 2, the position of the object is detected based on the reflection point of the search waves by the radar device 21. Here, a plurality of detection points QA are detected in accordance with a site that can be a reflection point (detection point) of search waves such as unevenness or the like on the rear side portion or the rear portion of the front car 60. Then, of the detected plurality of detection points QA, representative points representing the object are acquired. In the present embodiment, configuration is such that a detection point having the largest reflection intensity is set as a representative point, and in this configuration, in (A) of FIG. 2, the detection point Q corresponding to the rear end portion of the front vehicle 60 is set as a representative point. Then, the ECU 10 performs collision avoidance control based on this representative point (detected point Q). Collision avoidance control is performed based on the fact that the object is positioned within the collision prediction area, however, in the situation in (A) of FIG. 2, since the detection point Q is not in the collision prediction area S, collision avoidance control is not implemented.

Note that the representative point of the detection points may be a single point selected from a plurality of detection points (for example, a point having a large reflection intensity, a left end point or a right end point, or an intermediate point among a plurality of detection points), or a middle point between the left end point and the right end point.

On the other hand, in (B) of FIG. 2, the position of the object is detected based on pattern matching using image data of the imaging device 22. Here, by comparing the image data with the dictionary information of the pattern of the rear portion of the automobile, the area A of the rear portion of the front vehicle 60 is detected. Then, the ECU 10 performs the collision avoidance control based on this area A. Therefore, in the situation in (B) of FIG. 2, since the area A is not within the collision prediction area S, collision avoidance control is not executed. As described above, in the situation of a front object cutting in, the position of the front object may not be accurately detected by the object detection sensor.

Therefore, in the present embodiment, in the case where there is an object moving toward the front of the host vehicle 50 in a direction intersecting the traveling direction of the host vehicle 50, the object detection sensors 21 and 22 determine that a portion other than the front end portion of the object has been acquired as the object detection position. Then, in the case where it is determined that a portion other than the front end portion of the object has been acquired, even when the lateral position of the acquired portion is not in the collision prediction area, the collision avoidance control is permitted to be performed.

More specifically, the front end lateral position XA of the object is estimated, and collision avoidance control is executed based on the fact that the estimated front end lateral position XA is in the collision prediction area. With such a configuration, for example, in the situations in (A) and (B) of FIG. 2, the lateral position of the front end portion P of the front vehicle 60 is in the collision prediction area S, so it is possible to perform collision avoidance control. That is, at the time when the front object cuts in, the timing for performing collision avoidance control is advanced by using the front end lateral position XA of the object that is cutting in rather than the lateral position actually acquired by the object detection sensors 21, 22. Incidentally, the front end lateral position XA corresponds to the lateral position in the vehicle width direction of the host vehicle 50 on the front end portion of the side (the left side or the right side of the object) where the object is inclined with respect to the host vehicle 50.

In the present embodiment, the ECU 10 determines that a portion other than the front end portion of the front object is acquired by the object detection sensors 21, 22. Here, in a situation where the object is moving in the same direction as the host vehicle 50 and cuts in in front of the host vehicle, the rear end portion of the object is easily detected, and it is possible that the position of that rear end portion will be acquired as the detected position of the object. Therefore, the ECU 10 recognizes a situation in which the object cuts in in front of the host vehicle while moving in the same direction as the host vehicle 50, and so the ECU 10 determines that a portion other than the front end portion of the front object is acquired as the detected position of the front object. More specifically, the ECU 10 performs a determination of cutting in. For determining that there is cutting in, a well-known method can be applied, for example, and determination can be performed based on the lateral position of the object. With such a configuration, for example, when the lateral distance between the lateral position of the front vehicle 60 and the lateral position of the host vehicle 50 becomes smaller than a threshold value With, it is determined that there is cutting in. It should be noted that the threshold value With is set based on the width of the host vehicle's own lane or the like. In addition, it is possible to determine that there is cutting in based on the amount of lateral movement and the lateral velocity Vx of the front vehicle 60.

Figure 3:
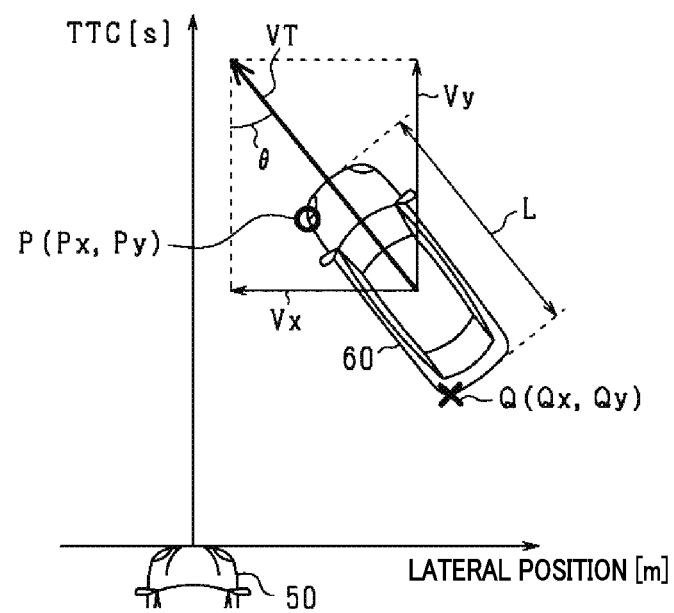
FIG. 3 is a diagram for explaining calculation of the front end lateral position of the front vehicle.

In addition, the ECU 10 estimates the front end lateral position XA of the front vehicle 60 based on the position of a portion other than the front end portion of the object acquired by the object detection sensors 21, 22. FIG. 3 illustrates an example of a method for calculation when estimating the front end lateral position XA. Here, in the case where the detection point Q is acquired as the representative point of the front vehicle 60 by the radar device 21, the front end lateral position XA of the front vehicle 60 is calculated based on the velocity vector VT of the front vehicle 60.

More specifically, the ECU 10 first calculates a traveling angle θ of the front vehicle 60 from the longitudinal velocity Vy and the lateral velocity Vx of the front vehicle 60 based on the following Equation (1). The longitudinal speed Vy of the front vehicle 60 is calculated by adding the relative speed with respect to the front vehicle 60 to the vehicle speed of the host vehicle 50 acquired by the vehicle speed sensor 23. The lateral speed Vx of the front vehicle 60 is calculated from the amount of change in the lateral position (for example, the detection point Q) of the front vehicle 60 per unit time. Furthermore, the traveling angle θ is 0° in the case where the speed vector VT of the front vehicle 60 extends in the same direction with respect to the traveling direction of the vehicle 50 (in other words, is parallel), and the angle increases the more the front vehicle 60 faces in the lateral direction with respect to the host vehicle 50.

$$\sin \theta = Vx/\sqrt{(Vx^2+Vy^2)} \quad (1)$$

Then, the ECU 10 calculates the front end lateral position XA of the front vehicle 60 from the calculated traveling angle θ of the front vehicle 60 based on the following Equation (2).

$$\text{Front end lateral position } XA = \text{Lateral position by sensor detection} + \text{vehicle length } L \times \sin \theta \quad (2)$$

Here, the front end lateral position XA and the lateral position obtained by sensor detection indicate the value of the vehicle width direction (X axis component) on the relative coordinate system. In other words, in FIG. 3, the lateral position by sensor detection corresponds to Qx, and the front end lateral position XA corresponds to Px. In addition, the vehicle length L of the front vehicle 60 is the length of the vehicle in the movement direction of the front vehicle 60, and a specified value (for example, 4 m) is determined. Then, the ECU 10 performs collision avoidance control based on the estimated front end lateral position XA.

Incidentally, in FIG. 3, the front end lateral position XA of the front vehicle 60 is estimated using the detection result of the radar device 21, however, it is also possible to similarly estimate the front end lateral position XA of the front vehicle 60 from the area A of the rear portion of the front vehicle 60 detected based on a captured image of the imaging device 22. In other words, by applying the specified lateral position (for example, the lateral position at the left end) of the region A to the above-described Equation (2), the front end lateral position XA is calculated.

The collision avoidance control process performed by the ECU 10 will be described with reference to the flowchart in FIG. 4. This process is repeatedly executed by the ECU 10 at specified intervals.

First, in step S11, the object information outputted from the radar device 21 and the captured image outputted from the imaging device 22 are inputted. In step S12, it is determined whether a front vehicle 60 is present in front of the host vehicle based on the inputted captured image. The ECU 10 determines the presence of a front vehicle 60 by pattern matching with dictionary information of patterns of rear portions of vehicles.

In the case of a NO determination in step S12, the present process is terminated as is. In the case of a YES determination in step S12, the process proceeds to step S13, and the ECU 10 acquires the lateral position of the front vehicle 60. For example, the lateral position is acquired based on the object information outputted from the radar device 21. In subsequent step S14, it is determined whether the front vehicle 60 is cutting in into the traveling path of the host vehicle 50. For example, the ECU 10 makes a cutting-in determination based on the lateral position of the front vehicle 60 described above. It should be noted that step S14 corresponds to a "determining unit".

In the case of a NO determination in step S14, the process proceeds to step S15, and it is determined whether the vehicle speed of the host vehicle 50 is equal to or higher than a threshold value Vth. The threshold value Vth is a determination value for determining whether the vehicle speed of the host vehicle 50 is a low speed, and, for example, is set to 20 km/h. Here, in the case were the host vehicle 50 is traveling at a low speed due to a traffic jam or the like, it is considered that cutting in is being performed in a state when the distance to the front vehicle 60 is near. When attempting to perform the collision avoidance control based on the estimated front end lateral position XA during such low speed traveling, there is a possibility that operations such as braking will frequently occur, which may cause inconvenience. Therefore, by providing a specified speed condition, the occurrence of this kind of inconvenience is suppressed. Incidentally, the threshold value Vth can be appropriately changed; for example, in the case where the collision avoidance control is performed based on the estimated front end lateral position XA when traveling at high-speed, the threshold value Vth is set, for example, to 60 km/h.

Moreover, in step S15, in addition to the vehicle speed, the lateral speed of the host vehicle 50 may also be added as a condition. In such a configuration, in the case where the vehicle speed is equal to or greater than the threshold value Vth and the lateral speed of the host vehicle 50 is equal to or greater than a specified value, the result in step S15 is YES.

In the case of a YES determination in step S15, or in other words, in the case where the speed condition is satisfied, the process proceeds to step S16 to estimate the front end lateral position XA of the front vehicle 60. For example, the front end lateral position XA is calculated by a method such as illustrated in FIG. 3 described above. Note that step S16 corresponds to an "estimating unit". In the subsequent step S17, the estimated front end lateral position XA is set as the lateral position of the front vehicle 60, and the process proceeds to step S18. Incidentally, step S15 and subsequent steps S18 to S23 for executing the collision avoidance control with the front end lateral position XA as the lateral position of the front vehicle 60 correspond to a "control unit".

On the other hand, in the case where NO is determined in both step S14 and step S15, the process proceeds to step S18. In such a case, collision avoidance control is performed with the lateral position acquired in step S13 as the lateral position of the front vehicle 60. In other words, ordinary collision avoidance control is performed based on the detection results of the object detection sensors 21, 22.

In the subsequent step S18, a collision prediction area is set. More specifically, the collision prediction area is set based on the lateral velocity Vx of the front vehicle 60. In step S19, it is determined whether the lateral position of the front vehicle 60 exists inside the set collision prediction area. It should be noted that in the case where the front end lateral position XA is set as the lateral position of the front vehicle 60 in step S17, it is determined whether the front end portion of the front vehicle 60 is positioned within the collision prediction area. In the case of a NO determination in step S19, there is no possibility of collision between the front vehicle 60 and the host vehicle 50, and the present process is terminated as is. In the case of a YES determination in step S19, the process proceeds to step S20.

In step S20, it is determined whether the relative distance between the front vehicle 60 existing in the collision prediction area and the host vehicle 50 less than a first specified distance D1. In the case of a NO determination in step S20, the present process is terminated as is. In the case of a YES determination in step S20, the process proceeds to step S21. In step S21, in order to warn the driver that the front vehicle 60 existing in the collision prediction area is approaching the host vehicle 50, an operation instruction is transmitted to the warning device 31.

In step S22, it is determined whether the relative distance between the front vehicle 60 existing in the collision prediction area and the host vehicle 50 is less than a second specified distance D2. This presumes a case in which the front vehicle 60 is continuing to approach the host vehicle 50 even though the warning device 31 issues a warning to the driver. In the case of a NO determination in step S22, the present process is terminated as is. In the case of a YES determination in step S22, the process proceeds to step S23, and an operation instruction is transmitted to the brake device 32.

In the case where the front vehicle 60 leaves the collision prediction area during the period in which the operation instruction is being transmitted to the warning device 31 in step S21, or during the period in which the operation instruction is being transmitted to the brake device 32 in step S23, the process of step S21 or the process of step S23 that is being executed immediately stops.

According to the present embodiment described in detail above, the following excellent effects can be obtained.

In the case where there is a front vehicle 60 moving toward the front of the host vehicle 50 in a direction intersecting with the traveling direction of the host vehicle 50, it is determined that a portion other than the front end portion of the front vehicle 60 has been acquired by the object detection sensors 21, 22 as the detection position of the front vehicle 60, and in the case where it is determined that a portion other than the front end portion of the front vehicle 60 is acquired, configuration is such that performing collision avoidance control is permitted even though the lateral position of the acquired portion may not be positioned within the collision prediction area. Therefore, compared with the case where collision avoidance control is performed based only on the lateral position acquired by the object detection sensors 21, 22, the collision avoidance control can be performed more quickly. As a result, the collision avoidance control can be appropriately performed with respect to the front vehicle 60 entering into the traveling path of the host vehicle 50.

In a situation where the front vehicle 60 cuts in in front of the host vehicle 50 while moving in the same direction as the host vehicle 50, the rear end portion of the front vehicle 60 is easily detected, and it possible to acquire the position of that rear end portion as the detection position of the front vehicle 60. In consideration of this point, in the above-described configuration and in a situation where the front vehicle 60 cuts in in front of the host vehicle 50 while moving in the same direction as the host vehicle 50, it is determined that a portion other than the front end portion of the front vehicle 60 is acquired as the detection position of the front vehicle 60, so determination can be performed with good accuracy.

In a situation where the front vehicle 60 enters at an angle into the traveling path of the host vehicle 50, the front end portion of the forward vehicle 60 may be considered to be positioned within the collision prediction area, and in such a case, it is preferred that collision avoidance control be performed. In consideration of this point, in the above-described configuration, the front end lateral position XA of the front vehicle 60 is estimated based on a portion (rear end portion) other than the front end portion of the front vehicle 60 acquired by the object detection sensors 21, 22, and collision avoidance control is performed based on the fact that the estimated front end lateral position XA is in the collision prediction area. Therefore, even when the lateral position of the object acquired by the object detection sensors 21, 22 is not in the collision prediction area, collision avoidance control can be performed as long as the front end lateral position XA is in the collision prediction area. As a result, collision avoidance control can be performed more quickly at the time when the front vehicle 60 cuts in.

Since the front vehicle 60 enters at an angle with respect to the host vehicle 50 at the time of cutting in, from a geometrical relationship, it is considered that the front end lateral position XA of the front vehicle 60 depends on the length in the movement direction of the front vehicle 60 and the movement angle of the front vehicle 60. In consideration of this point, the front end lateral position XA of the front vehicle 60 is estimated based on the length (vehicle length L) and the movement angle (traveling angle θ) of the object, so that the front end lateral position XA of the front vehicle 60 can be estimated with good accuracy, and thus collision avoidance control can be appropriately performed.

In the case where the host vehicle 50 is traveling at a low speed due to a traffic jam or the like, the cutting-in operation is performed in a state in which the distance between the host vehicle 50 and the front vehicle 60 is close. Even at the time of cutting in under such circumstances, when attempting to estimate the front end lateral position XA of the front vehicle 60 and to perform collision avoidance control based on the front end lateral position XA, there is a possibility that unnecessary operations such as braking may occur frequently. In consideration of this point, in the case where the vehicle speed of the host vehicle 50 is less than the threshold value Vth, collision avoidance control based on the estimated front end lateral position XA is not performed, so collision avoidance control can be appropriately performed while suppressing occurrence of unnecessary operation.

The embodiment described above may be modified as follows, for example.

In the embodiment described above, in the estimation of the front end lateral position XA of the front vehicle 60, the traveling angle θ is calculated from the speed vector VT of the front vehicle 60, and the front end lateral position XA is calculated using that traveling angle θ. In regard to this point, calculation of the traveling angle θ is not limited to this method, and it may be calculated based on the movement locus between the host vehicle 50 and the front vehicle 60 as illustrated in FIG. 5, for example.

Figure 5:
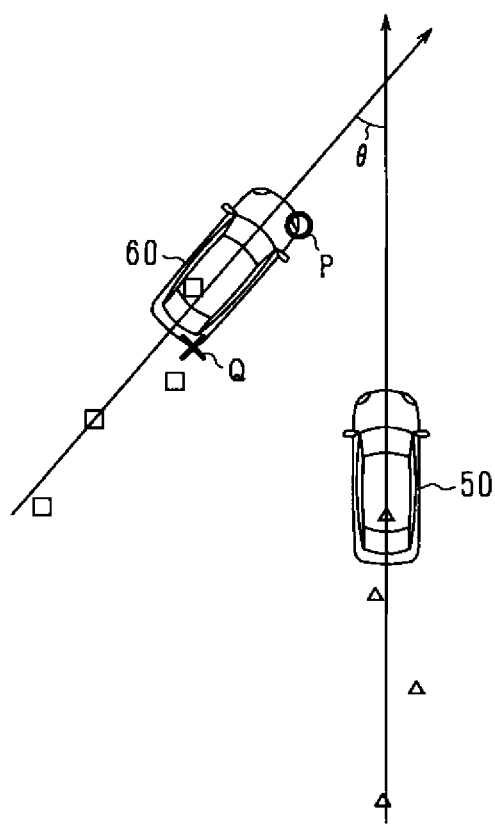
FIG. 5 is a diagram for explaining calculation of the advancing angle of the front vehicle in another example.

FIG. 5 illustrates a position history of both the host vehicle 50 and the front vehicle 60. By using a known linear interpolation calculation such as a least squares method for this position history, movement vectors of the host vehicle 50 and the front vehicle 60 are calculated, respectively. These movement vectors can be regarded as linear functions on the same coordinate system and can be expressed by the following Equations (3) and (4).

Movement vector of the host vehicle $y=ax+b$ (3)

Movement vector of the front vehicle $y=cx+d$ (4)

Then, an angle (a traveling angle θ of the front vehicle 60) formed by the movement vectors of the host vehicle 50 and the front vehicle 60 is calculated based on the slopes a and c in each linear function based on the following Equation (5).

Traveling angle $\theta=\arctan(c)-\arctan(a)$ (5)

Incidentally, by using the calculated traveling angle θ, the front end lateral position XA of the front vehicle 60 is calculated based on the above Equation (2).

Figure 4:
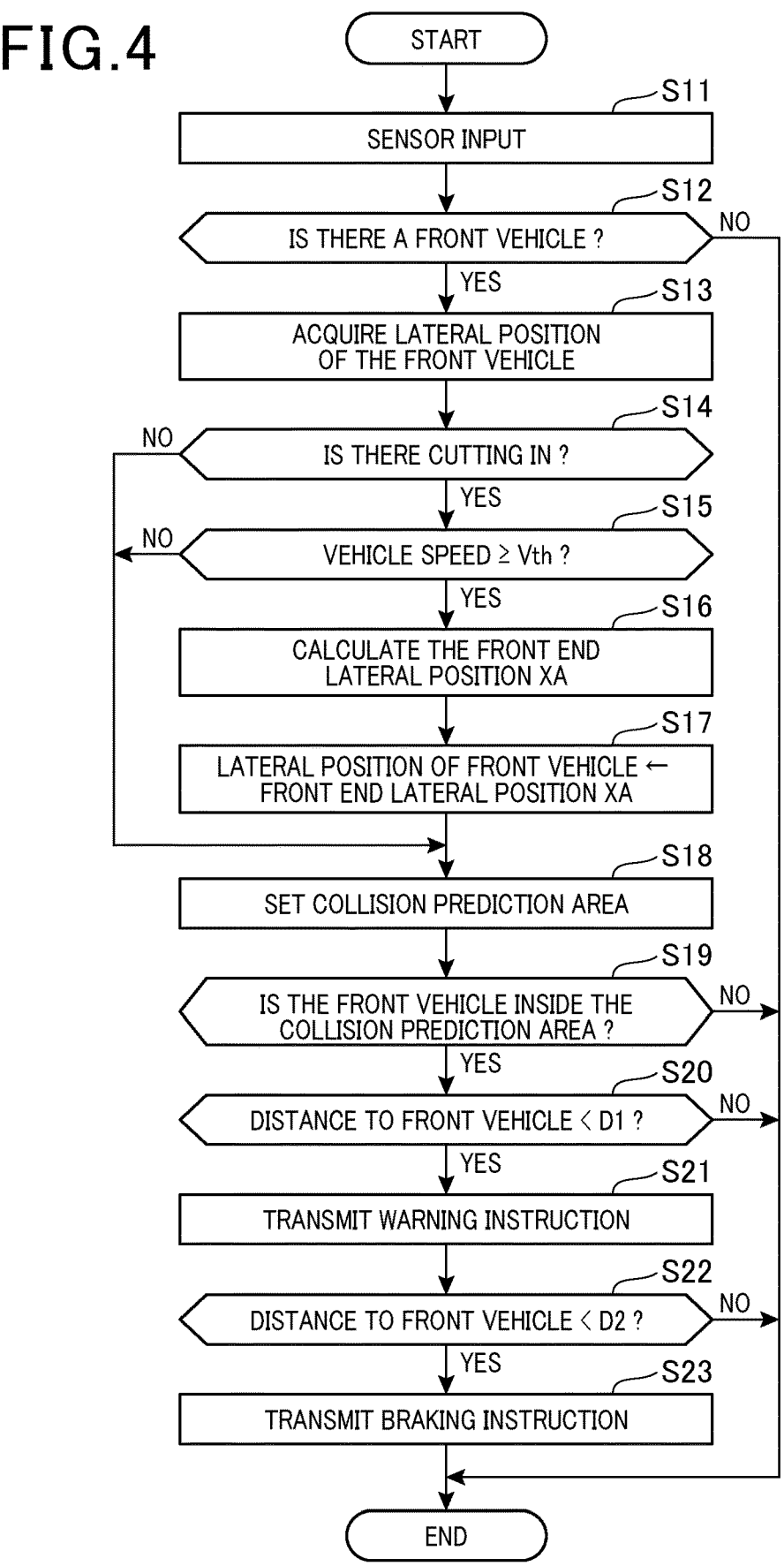
FIG. 4 is a flowchart illustrating a control process executed by the vehicle control device according to an embodiment.

The cutting-in determination in step S14 in FIG. 4 may be performed based on other than the lateral position, the lateral velocity Vx, and the amount of movement of the front vehicle 60. Here, when the front vehicle 60 cuts in into the traveling path of the host vehicle 50, paying attention to the fact that the side portion of the front vehicle 60 faces the front side of the host vehicle 50, cutting in by the front vehicle 60 can be determined when the side portion of the vehicle 60 is detected as the detection point by the radar device 21.

In the embodiment described above, configuration is such that the front object is taken to be a front vehicle 60, and a predetermined vehicle length L is used in estimating the front end lateral position XA of the front vehicle 60. In regard to this point, the configuration is not limited to this, and for example, configuration may be such that the length in the movement direction of the object (that is, the vehicle length L) may be variably set. In this case, the ECU 10 estimates the length of the front object and estimates the front end lateral position XA of the object based on the length of the front object. According to the above-described configuration, the front end lateral position XA can be estimated with good accuracy according to the length of the object, and collision avoidance control can be performed appropriately. Note that in the ECU 10, the process of estimating the length of the front object corresponds to a "length estimating unit".

On the other hand, it is considered that as the length of the front object becomes longer, the deviation between the lateral position by the sensor detection and the front end lateral position XA of the front object increases. In other words, it is considered that the longer the length of the front object is, a situation easily occurs in which even though the lateral position by sensor detection is not in the collision prediction area, the front end lateral position XA of the front object is in the collision prediction area. In consideration of this point, for example, configuration can be such that in the case where the length in the movement direction of the front object is long, it is possible to make it easier to perform collision avoidance control based on the front end lateral position XA in comparison with the case where the length in the movement direction is shorter. With such a configuration, for example, by changing the calculation of the TTC or the setting of the collision prediction area, collision avoidance control can be easily performed.

Figure 6:
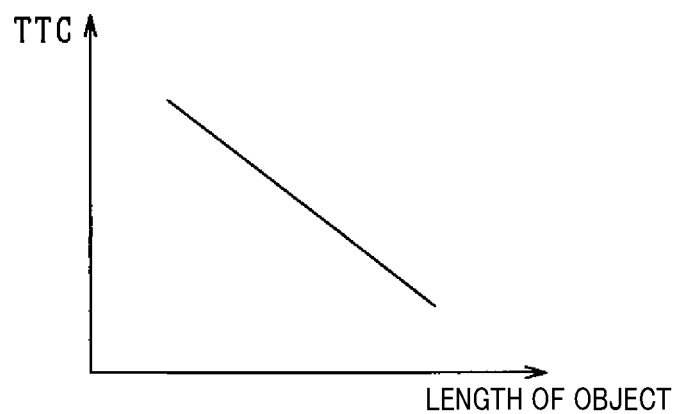
FIG. 6 is a diagram illustrating the relationship between the length of an object and the TTC.

FIG. 6, as an example, illustrates the relationship between the length of the front object and the TTC. Here, as the length of the front object increases, the TTC is calculated as a smaller value. In other words, as the length of the front object increases, the TTC is corrected to be a smaller value. Instead of the value of TTC, the setting of a threshold value TTCth, which to be compared with the TTC in an operation determination of the warning device 31 or the like, may be changed. In this case, as the length of the front object increases, the threshold value TTCth is set as a larger value.

According to this configuration, in the case where the length of the object is long, collision avoidance control can be performed more quickly in comparison with the case where the length of the object is shorter. For example, in the case of a cutting-in situation as illustrated in FIG. 2, It is presumed that the collision prediction area S is inside an imaginary line obtained by extending the width of the host vehicle 50 in the traveling direction of the host vehicle 50, and even when the rear portion of the front vehicle 60 is not positioned within the collision prediction area S, as long as the front end portion P of the front vehicle 60 is in the collision prediction area S, collision avoidance control is performed earlier the longer the total length of the front vehicle 60 is.

When the traveling angle θ of the front object is within the range 0° to 90° and as the traveling angle θ increases (in other words, as the angle with respect to the host vehicle 50 increases), it is considered that the deviation between the lateral position by the sensor detection and the front end lateral position XA of the front object will increase. In other words, it is considered that the larger the traveling angle θ of the front object is, a situation easily occurs in which even though the lateral position by sensor detection is not in the collision prediction area, the front end lateral position XA of the front object is in the collision prediction area. In consideration of this point, for example, configuration can be such that in the case where the traveling angle θ of the front object is large, it is possible to make it easier to perform collision avoidance control based on the front end lateral position XA in comparison with the case where the length in the movement direction is shorter. With such a configuration, for example, by changing the calculation of the TTC or the setting of the collision prediction area, collision avoidance control can be easily performed.

Figure 7:
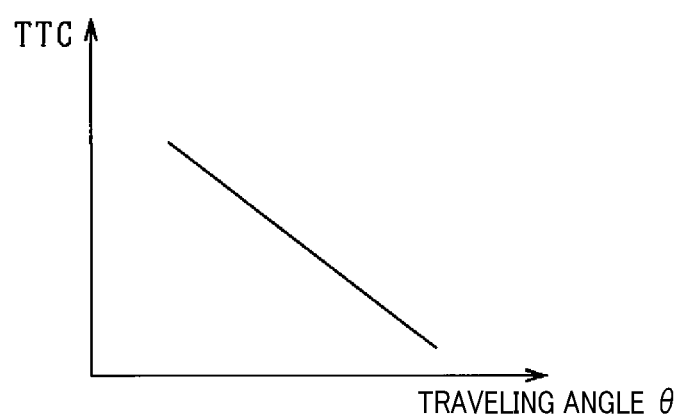
FIG. 7 is a diagram illustrating the relationship between the traveling angle and the TTC.

FIG. 7 illustrates the relationship between the traveling angle θ (0 to 90°) and the TTC as an example. Here, as the traveling angle θ increases, the TTC is calculated as a smaller value. In other words, as the traveling angle θ increases, the TTC is corrected to be a smaller value. Instead of the value of TTC, the setting of a threshold value TTCth to be compared with the TTC in an operation determination of the warning device 31 or the like may be changed. In this case, as the traveling angle θ increases, the threshold value TTCth is set to a larger value.

With this configuration, in the case where the traveling angle θ of the front object is large, collision avoidance control can be performed more quickly in comparison with the case where the traveling angle θ is smaller. For example, in the case of a cutting in situation as illustrated in FIG. 2, in the case where it is presumed that the inside of a virtual line obtained by extending the width of the host vehicle 50 in the traveling direction of the host vehicle 50 is the collision prediction area S, collision avoidance control is performed earlier as the traveling angle θ of the front vehicle 60 becomes larger, as long as the front end portion P of the front vehicle 60 is in the collision prediction area S even though the rear portion of the front vehicle 60 is not in the collision prediction area S.

In the embodiment described above, a case is described in which, in object detection by a radar device 21, the detection point Q (rear end portion) of a front vehicle 60 is acquired as a representative point, however, a case is also possible in which a detection point other than the detection point Q, or in other words, a detection point of a portion corresponding to a portion other than the rear end portion may be acquired as the representative point. Note that in such a case, the front end lateral position XA may be calculated based on the following Equation (6).

Front end lateral position $XA$=Lateral position by sensor detection+vehicle length $L$×sin θ×correction coefficient $k$ \hfill (6)

Here, the correction coefficient k is a value greater than 0 and less than or equal to 1, and is set according to the position of the representative point. For example, in the case where the middle point between the front end portion and the rear end portion of the front object is detected as a representative point, the correction coefficient k has a value of ½.

Moreover, in the case of a special vehicle such as a truck with a cargo bed, it is also conceivable that the reflection strength of the side portion becomes larger than that of the rear end portion of the special vehicle due to unevenness related to the cargo bed. Also in such a case, the front end lateral position XA of the special vehicle can be estimated with good accuracy by using the correction coefficient k based on the Equation (6).

In the embodiment described above, it is presumed that the front vehicle 60 cuts in at a junction of branch roads in a road with plural lanes. Here, in such a situation of cutting in, it is considered that the traveling angle θ of the front vehicle 60 is a value (for example, around 30°) that is set to a certain extent. In consideration of this point, a configuration is possible in which a specified value for estimating the front end lateral position XA is determined, and in the case where it is determined that there is cutting in by the front vehicle 60, the front end lateral position XA is calculated without calculating the traveling angle θ. With this configuration, the calculation load can be reduced.

In the embodiment described above, the configuration is such that collision avoidance control is performed in the host vehicle 50 equipped with a radar device 21 and an imaging device 22 as the object detection sensors, however, a configuration is also possible in which collision avoidance control is performed in a host vehicle 50 equipped with only the imaging device 22 of the radar device 21 and the imaging device 22.

In the embodiment described above, configuration is such that in the case of an ECU 10 having a PCS function, the front end lateral position XA of the front vehicle 60 is estimated at the time of cutting in so that the front vehicle 60 becomes the target of collision avoidance control earlier. In regard to this point, for example, the above-described configuration may also be applied to a ECU 10 having an ACC (Adaptive Cruise Control) function for performing control to make the vehicle follow the preceding vehicle. In such a case, when there is cutting in by the front vehicle 60, the target of the preceding vehicle can be changed more quickly.

Although the technique according to the present disclosure has been described in accordance with the embodiments, it is understood that the technique according to the present disclosure is not limited to those embodiments and structures. The technique according to the present disclosure encompasses various modifications and variations within an equivalent scope. In addition, various combinations and forms, and furthermore, other combinations and forms including only one element, or more or less are also within the scope and concept of the present disclosure.

The invention claimed is:

1. A vehicle control device for detecting an object existing in front in a traveling direction of a host vehicle by an object detection sensor and performing collision avoidance control with respect to the object based on a representative point of detected points, the vehicle control device comprising:
a determining unit that, in a case where there is an object moving toward the front of the host vehicle in a direction intersecting the traveling direction of the host vehicle, determines that a portion other than a front end portion of the object is acquired by the object detection sensor as the representative point;
an estimating unit that, in a case where it is determined by the determining unit that a portion other than the front end portion of the object is acquired as the representative point, estimates a front end lateral position as a lateral position of the front end portion of the object based on a portion other than the front end portion of the object acquired by the object detection sensor; and
a control unit that, in a case where it is determined that a portion other than the front end portion of the object has been acquired as the representative point, permits collision avoidance control to be performed on the basis that the front end lateral position estimated by the estimation unit belongs to a collision prediction area even when a lateral position of the acquired portion is not in the collision prediction area as a target of the collision avoidance control.

2. The vehicle control device according to claim 1, wherein
the determining unit determines that a portion other than the front end portion of the object is acquired as the representative point in a case where the object is in a state of cutting in in front of the host vehicle while moving in the same direction as the host vehicle.

3. The vehicle control device according to claim 1, wherein
the estimating unit, together with acquiring a length of the object in a movement direction of the object and a movement angle formed by the movement direction of the object with respect to the traveling direction of the host vehicle, estimates the front end lateral position based on the acquired length and the movement angle of the object.

4. The vehicle control device according to claim 1, wherein
the control unit, in a case where a vehicle speed of the host vehicle is less than a specified value, does not perform the collision avoidance control based on the front end lateral position estimated by the estimating unit.

5. The vehicle control device according to claim 1, further comprising
a length estimating unit that estimates the length of the object in a movement direction of the object; and
wherein
the control unit, in a case where the length of the object is long, sets the collision avoidance control based on the front end lateral position estimated by the estimating unit to be performed more easily in comparison with a case in which the length of the object is shorter.

6. The vehicle control device according to claim 1, wherein
the control unit, in a case where a movement angle formed by a movement direction of the object with respect to the traveling direction of the host vehicle is large, sets the collision avoidance control based on the front end lateral position estimated by the estimating unit to be performed more easily in comparison with a case in which the movement angle is smaller.

* * * * *